United States Patent
Schmitt et al.

(10) Patent No.: US 7,881,945 B2
(45) Date of Patent: Feb. 1, 2011

(54) SYSTEM AND METHOD FOR MANAGING DATA CONCERNING SERVICE DISPATCHES INVOLVING GEOGRAPHIC FEATURES

(75) Inventors: Douglas Schmitt, Round Rock, TX (US); Alexandre Fiore Barretto, Round Rock, TX (US); Mark R J Betteridge, Round Rock, TX (US); Richard Nhat Nguyen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1353 days.

(21) Appl. No.: 10/952,429

(22) Filed: Sep. 28, 2004

(65) Prior Publication Data

US 2006/0069577 A1    Mar. 30, 2006

(51) Int. Cl.
*G06Q 99/00* (2006.01)
(52) U.S. Cl. ...................................................... 705/1.1
(58) Field of Classification Search ............. 705/1, 705/1.1
See application file for complete search history.

(56) References Cited

U.S. PATENT DOCUMENTS

| | | | |
|---|---|---|---|
| 5,168,451 A * | 12/1992 | Bolger | 701/117 |
| 6,233,517 B1 * | 5/2001 | Froeberg | 701/117 |
| 6,339,745 B1 * | 1/2002 | Novik | 701/208 |
| 6,556,981 B2 * | 4/2003 | Pedersen et al. | 706/44 |
| 6,757,521 B1 | 6/2004 | Ying | 455/67.11 |
| 6,788,765 B1 | 9/2004 | Beamon | 379/27.01 |
| 6,816,815 B2 | 11/2004 | Takayama | 702/184 |
| 6,822,945 B2 | 11/2004 | Petrovykh | 370/270 |
| 6,848,104 B1 | 1/2005 | Van Ee et al. | 719/310 |
| 7,043,357 B1 * | 5/2006 | Stankoulov et al. | 701/200 |
| 7,173,526 B1 * | 2/2007 | Monroe | 340/521 |
| 2002/0055861 A1 * | 5/2002 | King et al. | 705/4 |
| 2003/0040865 A1 * | 2/2003 | Rigazio et al. | 701/207 |
| 2003/0109985 A1 * | 6/2003 | Kotzin | 701/209 |
| 2005/0085257 A1 * | 4/2005 | Laird et al. | 455/550.1 |

* cited by examiner

*Primary Examiner*—Jonathan Ouellette
(74) *Attorney, Agent, or Firm*—Baker Botts L.L.P.

(57) ABSTRACT

A method and system are disclosed that enable a seller of equipment to dispatch service personnel and parts to a remote location while taking into account geographic-specific conditions. The geographic-specific conditions can include, for example, inclement weather, planned activities and unplanned events that affect traffic to/from the remote location. The system includes, among other things, telecommunication facilities that link sellers, purchasers and third party service vendors. The system may also include data repository facilities to persist data that is received from external sources, generated from within, or sent outside the system. Persistent and/or transient data can be correlated with geographic-related externalities in order to modify the dispatch activities in order to meet ongoing commitments.

23 Claims, 11 Drawing Sheets

Automated Monitoring Tool

Page Refreshed 6/18/2004 9:59:05 AM

| Equipment | Type | Status | Cmp# | Customer nme | (S)ervice (P)art ETA | Call Age | Prb Cnt | Owner | Take |
|---|---|---|---|---|---|---|---|---|---|
| 4625571 0 | TMU | ORD | 02 | UNIVERSITY HOSPITAL | S: 6/21/2004 2:00:00 PM | 0:51 | ///// | --- | Take |
| 46257481 | WS4 | LAK | 08 | CENTRAL FREIGHT | None | 0:12 | ///// | --- | Take |
| 46256629 | P05 | ORD | 25 | SOUTHERN BANK | P: 6/18/2004 11:17:00 AM | 1:10 | ///// | Mary Jones | Take |
| 46256925 | P09 | ORD | 04 | EXPRESS SHIPPING | P: 6/18/2004 11:09:00 AM | 0:26 | ///// | Todd Smith | Take |
| 46255765 | Q40 | SHP | 40 | ENERGY COMPANY | S: 6/18/2004 12:41:00 PM | 16:38 | 1 | --- | Take |
| 46244884 | U99 | SHP | 45 | SCHOOL DISTRICT | S: 6/18/2004 10:30:00 AM | 15:12 | 1 | Mary Jones | Take |
| 46244228 | Q40 | POD | 04 | DIVERS. RESOURCES | S: 6/18/2004 11:00:00 AM | 14:14 | 3 | Todd Smith | Take |
| 46244280 | P05 | SHP | 04 | CABLE COMPANY | P: 6/18/2004 10:30:00 AM | 6:26 | 0 | --- | Take |
| 46241076 | Q99 | SHP | 06 | IMPORTER CO. | S: 6/18/2004 11:00:00 AM | 5:12 | 0 | --- | Take |
| 46240615 | Q40 | POD | 05 | DISCOUNT STORE | S: 6/18/2004 10:59:00 AM | 4:34 | 0 | Mary Jones | Take |

*Figure 4*

| Equipment/Tag | Type | Status | Vend | LOB | Cmp# | Customer Name | Cust# | System Type |
|---|---|---|---|---|---|---|---|---|
| 46256629 H9S7B21 | TMU | ORD | 5 | 5 | 02 | SOUTHERN BANK | 803427 | Dim 8250,2.4GHz, P4N |

Service

| SP Number | Created Date/Time | SP Date/Time | Ack Date/Time | Status Code | Status Text |
|---|---|---|---|---|---|
| 23433101 | 6/18/2004 08:01:00 AM | 6/18/2004 08:14:00 AM | 6/18/2004 08:29:00 AM | | |
| Time Zone | ETA Date/Time | Completed Date/Time | Deferral Date/Time | Customer Deferred | Submit |
| EST (-1) | 6/18/2004 11:17:00 AM | None | | ☐ | Submit Form |

P4 Parts

| Qty | Number | Discription |
|---|---|---|
| 1 | 0W912 | ASSY, CRD, PLN, NIC, DIM8250 |

Problem Info
Problem Log Detail

| Date/Time | Description | Ack Name/Time | Resolved Name/Time |
|---|---|---|---|
| 6/18/2004 08:05:00 AM | Service Dispatch Not Transmitted to SP | Mary Jones 6/18/2004 08:06:00 AM | Mary Jones 6/18/2004 08:14:00 AM |
| 6/18/2004 08:10:00 AM | Service Dispatch Not Acknowledged by SP | Mary Jones 6/18/2004 08:12:00 AM | Mary Jones 6/18/2004 08:29:00 AM |
| 6/18/2004 08:55:00 AM | Replacement Component Shipped | | None |
| 6/18/2004 09:55:00 AM | Replacement Component Received | None | None |

SYSTEM AND METHOD FOR MANAGING DATA CONCERNING SERVICE DISPATCHES INVOLVING GEOGRAPHIC FEATURES

CROSS REFERENCE TO RELATED APPLICATION

This application is related to co-pending U.S. patent application Ser. No. 10/952,546 entitled "System And Method For Managing Data Concerning Service Dispatches Involving Geographic Features" which was filed on Sep. 28, 2004, and U.S. patent application Ser. No. 10/952,456 entitled "Apparatus and System for Monitoring and Managing Equipment and Services", which was also filed on Sep. 28, 2004, both of which are incorporated herein by reference for all purposes.

TECHNICAL FIELD

The present disclosure relates generally to field of data processing, and, more particularly, to a system and method for managing data concerning service dispatches, particularly when conditions at specific geographic locations directly affect performance and capability.

BACKGROUND

From time to time, equipment sold by a seller to a customer may require service. This service is often initiated by a service call that is communicated from the customer to the seller. In response to the service call, the seller may initiate a service dispatch to attempt to resolve the difficulties being experienced by the customer. One difficulty of managing service dispatches involves identifying service dispatches that require attention or are overdue for completion. Often, a number of service dispatches will be open and in progress at any one time. Monitoring the status and progress of each service dispatch is critical, as many service dispatches must be completed within a contractual window. The difficulty of monitoring service dispatches is often exacerbated by the inability of the seller or service provider to retrieve, on an automated basis, real-time data concerning the status of the service dispatch. If the progress or status of a service dispatch cannot be monitored, the service provider may first learn about an overdue service dispatch when the service dispatch remains unresolved and falls outside the contractual window of completion. The problems experienced by dispatchers is compounded when geographic-related externalities are encountered. Geographic-related externalities include inclement weather, planned events (such as political conventions) with attendant traffic interruption, and unplanned vents (such as auto accidents that block the flow of traffic). This technique for handling service dispatches places the service provider in a reactive mode and may reduce customer satisfaction.

SUMMARY

In accordance with the present disclosure, a system and method is disclosed in which service dispatch data records are generated and overlaid with geographic-related information, such as street locations, weather patterns, traffic accidents and the like. The data is displayed such that those service dispatch data records requiring attention or a response from a service representative for routing purposes are displayed most prominently according to a predefined sorting criteria. The system and method disclosed herein includes a product database that includes data concerning the products capable of being serviced by the service provider and the service obligations of the service provider for customers and products of the service provider. The system and method disclosed herein additionally includes a service provider database that stores data concerning the service resources available for competing the tasks required by each service dispatch. The system and method disclosed herein additionally includes a geographic information database that can include, for example, the locations of fixed or moving objects and their physical relationship with one or more other objects. A dispatch generation tool generates the service dispatches and a service dispatch management module sorts and displays the service dispatch data information on a map. Additional information may also be displayed on the map so that all geographic-related information can be combined with any other piece of data in the other databases. The use of the geographic-related information can help achieve one or more milestones that are imposed by contractual obligations.

The system and method disclosed herein is technically advantageous because it provides a technique for creating service dispatches on the basis of data from the seller of the product to be service, any third-party service providers, and the conditions affecting routing to or from the customer location. The system and method disclosed herein is also advantageous in that it provides a technique for sorting the generated service dispatches for display on a map in a manner that assists in the management and monitoring of the service dispatches. The service dispatches are organized for display such that the service dispatches that require an action on the part of a service representative, or a service provider, are readily identified and prominently displayed with geographic-related information that may affect the actions of individuals, or affect the completion of the dispatch within a given time period.

Another technical advantage of the system and method disclosed herein is that the system and method disclosed herein is able to provide and update the data concerning the service dispatches in real-time and in physical relation to each other. The data concerning each service dispatch is updated on periodic basis or in response to a service event. Other geographic-related information, such as traffic accidents, road closures, inclement weather, are also displayed so that appropriate action can be initiated.

The system and method described herein is also advantageous in that it establishes a series of expected gates or milestones in the completion of a service dispatch, and also displays potential problems that might cause a delay the completion of a milestone. If a gate is not met, the count of missed gates is incremented. Because the service dispatch records are sorted on the basis of the count of missed gates, those service dispatches with a history of missed gates are highlighted for review and analysis by a service representative or service supervisor. Geographic information provided on the map may assist dispatchers or other personnel to avoid problems or seek alternate routes in order to achieve milestones within acceptable time periods. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present disclosure concerns a technique for managing data concerning service dispatches while taking account of one or more externalities, such as weather, traffic accidents, planned road closures and the like. A service dispatch is initiated in response to a service call or service request. In the most general terms, a service call is a request initiated by a customer to a seller for assistance with the operation or use of equipment provided or sold by the seller to the customer. The customer could also direct a service request to a third-party service provider who is obligated by contract or otherwise to provide service for the equipment. A service call need not be limited to a request for assistance with equipment. A service call can also be made with respect to a service being used or provided to a customer. For example, a customer may make a service call to its Internet service provider concerning the operation of the customer's Internet access. In response to a service call, the service provider, whether the service provider is the seller of the product or service or a third-party obligated to respond to service calls, may initiate a service dispatch.

A service dispatch is the response to the customer's service call. A service dispatch involves the provision of service resources, including replacement components and in-person resources, for the purpose of resolving the service issue being experienced by the customer. As an example, in response to a service call concerning an equipment failure, the seller may initiate a service dispatch to the customer that involves the shipment to the customer of a replacement component and the simultaneous dispatch of a technician to install the replacement component and diagnose and repair any undiagnosed problems with the equipment. Although the present disclosure will refer to service calls and service dispatches resulting from equipment failure, the term equipment failure is used in this disclosure to characterize a broad range of operational difficulties ranging from non-functioning equipment to equipment experiencing operational difficulties.

Figure 1:
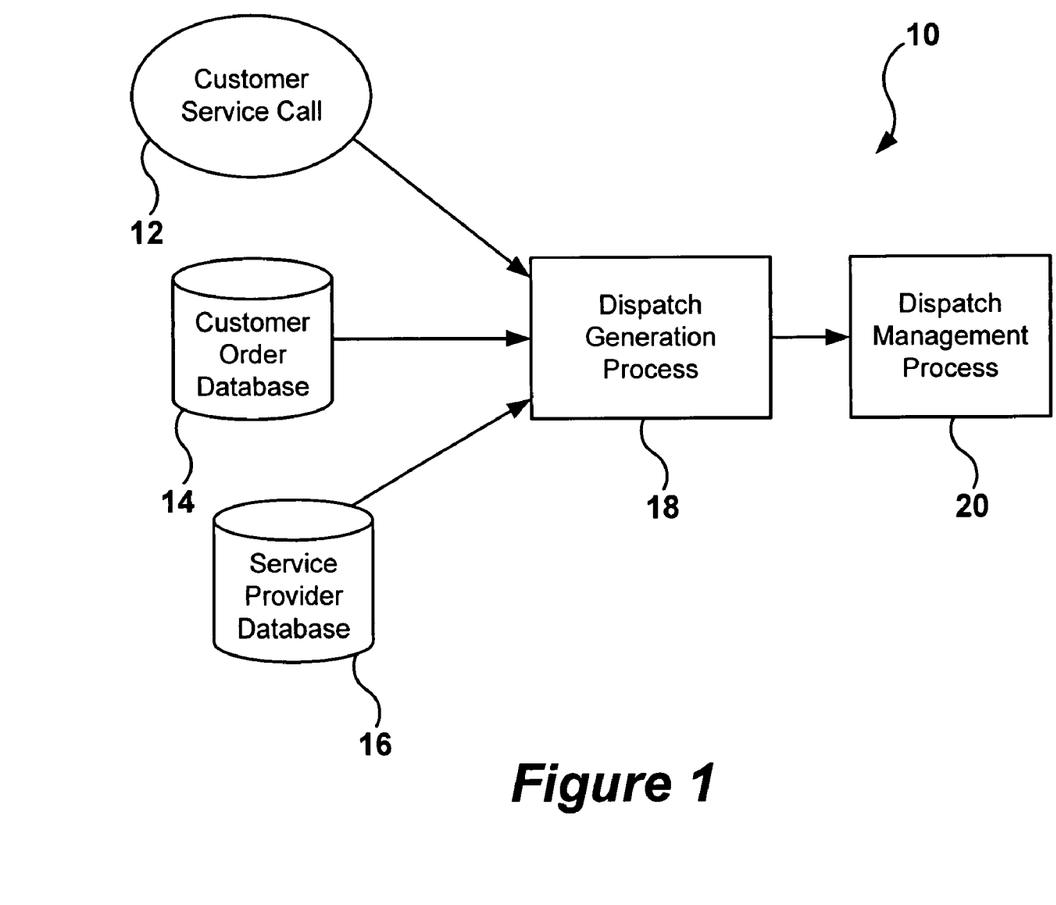
FIG. 1 is a data flow and architectural diagram of a system for generating and managing service dispatch data records.

Shown in FIG. 1 is a data flow and architectural diagram of a system, which is indicated generally at 10, for receiving, generating, and processing data concerning service dispatches. In the example of FIG. 1, a service call from a customer is received and processed by the seller of the equipment. As part of the service call, the customer will provide information to the seller concerning the problems being experienced by the customer. This information may be provided by the customer in responses to a series of questions or prompts from the seller. The information elicited from the customer may assist the seller in confirming the customer's self-diagnosis of the equipment failure or may assist the seller in diagnosing the cause of the equipment failure. As part of the service call to the seller, the seller will collect from the customer information concerning the equipment, including the model of equipment, a serial number for the equipment, and an indication of the service tag of the equipment or the service level obligation of the seller. The seller will also attempt to collect information concerning the location of the equipment and the customer's unique customer number. This data, which comprises service call data, is collected at node or event 12 and communicated to the dispatch generation process or module 18. It should be noted that the databases disclosed herein can be used to make the attendant data persistent, and to otherwise select, insert, update, modify, display, and/or sort the data.

With respect to the service level obligation of the seller, a service agreement for a piece of equipment is often purchased by the customer at the time of the purchase of the equipment. Because a customer may often choose from a range of service options, the service obligation of the seller will vary by customer and by equipment. The service obligation of the seller may be governed by a service level agreement that will describe the speed with which the seller must complete the service dispatch and the party (seller or customer) that bears the costs of the service call. With respect to the speed of the service call, the service dispatch may specify, for example, that the service dispatch will be completed by the seller within a two, four, eight, or twenty-four hour window. The service level agreement may be indicated by way of a service code or service tag associated with the equipment. During the service call, the seller will attempt to retrieve the service tag associated with the equipment so that the seller can identify the level of service to which the customer is entitled and the seller is obligated pursuant to the service level agreement between the seller and the customer.

Following the receipt of the service call, from the customer, the equipment at issue is identified by the seller. This identification can be made, for example, on the basis of the equipment serial number, service tag number, or on the basis of a description of the equipment and an identification of the customer. The identification of the equipment is made at the dispatch generation module 18, and data concerning the equipment that is the subject of the service call is retrieved from product database 14. Product database 14 includes data concerning the technical specifications of the equipment that is the subject of the service call, including information concerning the components that comprise the equipment. In addition to identifying the specifications and characteristics of the product or equipment that is the subject of the service call, product database 14 includes data concerning the service obligation, or service level agreement, between the seller and the customer for the equipment or product that is the subject of the service call. Product database 14 includes data concerning the requirements of the service level agreement, including information concerning the required response time for the service level agreement. Product database 14 may specify that, for the equipment at issue, the customer has a service level agreement that requires that service be completed in four hours. Customer database may also specify the specifications of the hardware and software components of the computer system.

After the seller has identified the equipment and diagnosed the cause of the equipment failure, the seller is able to identify resources for solving the cause of the equipment failure. These resources may comprise replacement components, including hardware or software components, or in-person resources, which may comprise a technician dispatched to the customer's location to correct the cause of the equipment failure. Often, the resolution of the equipment failure will involve a replacement component and an in-person resource in the form of a technician who is able to install and configure the replacement component.

An identification of the equipment at issue will also identify for the seller the service tag or service indicator for the equipment at issue. In addition to identifying the service level agreement for the customer and the equipment, the service level indicator will also enable the seller to identify any third-party service providers who are responsible for providing service to the equipment that is the subject of the service call. As an example, a seller of computer equipment may engage a third-party to make repairs to computer equipment in response to a service call from a customer. The seller of computer equipment may also engage a third-party delivery company to ship replacement components from component warehouses. The service level tag or indicator for the equipment will identify any service providers who are engaged by Dell to provide service resources for the service call. The dispatch generation process 18 will retrieve data concerning the resources of any engaged service providers from the service provider database 16. In addition, service providers may themselves update the data of service provider database 16 to reflect the status of service dispatches being performed by the service provider.

Following the receipt of data from the customer, the product database 14, and the service provider database 16, dispatch generation process 18 generates, if necessary, a service dispatch for the service call. A service dispatch is the seller's response to the customer's service call and may involve the dispatch of replacement components, in-person resources, or both to the customer's place of business. A service dispatch will not be necessary for each service call. Many service calls can be routinely resolved by a customer service representative without the necessity of dispatching component or in-person resources to the customer's location.

For each service dispatch, dispatch generation process 18 generates a record that includes all of the data relating to the dispatch, including the identification of the customer, the customer's physical location, the equipment at issue, the diagnosis, the service level obligation of the seller, and the third-party service providers who will be engaged to complete the service call. For each service dispatch, dispatch generation tool 18 sets out a series of gates or expected milestones for the completion of the service dispatch. Examples of the gates or expected milestones for a service dispatch include the confirmation by each engaged third-party service providers the service dispatch, the identification of a replacement component, the shipment of any replacement components to the customer's location, the departure of any in-person resources to the customer's location, the receipt of any replacement components at the customer's location, the arrival of any in-person components at the customer's location, and the resolution of the service call. The number and type of gates will vary according to the service dispatch. As an example, if the service dispatch is scheduled to be resolved through the replacement of a component by the customer without the involvement of any in-person resources, gates involving in-person resources will not be established for the service dispatch. While the service dispatch is open and not yet resolved, the dispatch generation tool monitors the extent to which the gates are met in the service dispatch. The dispatch generation tool maintains an identification and a count of the number of gates missed during the service dispatch.

As an example of the establishment of gates in the service fulfillment process, if a service dispatch is initiated for a customer who has a four-hour service level agreement, a series of gate will be established that provide progress points for the completion of the service dispatch within the four-hour window. In this example, assuming that the service dispatch involves the replacement of a component by a third-party service provider, one gate may be the transmission to the third-party service provider of the details and requirements of the service dispatch. With respect to timing, this gate will be set to expire one minute from the initiation of the service call. The next following gate could be a confirmation by the third-party party service provider that it is responsible for the call. This gate can be set to expire five minutes from the initiation of the service call. Another gate in this example could be a confirmation by the third-party service provider that the replacement component is in route to the customer's location. This gate can be set to expire thirty minutes from the initiation of the service call. As one more example, another gate could be the arrival of the replacement component at the customer's location. This gate could be set to expire two hours from the initiation of the service dispatch. The satisfaction of each milestone or gate may be communicated to the dispatch generation process 18 through service provider database 16. Dispatch generation process 18 will monitor the completion of milestones for each service dispatch. If the time for completion of a milestone is reached and there is not an indication at dispatch generation process 18 that the milestone has been reached, dispatch generation process 18 will increment a count of failed gates or milestones.

Figure 2:
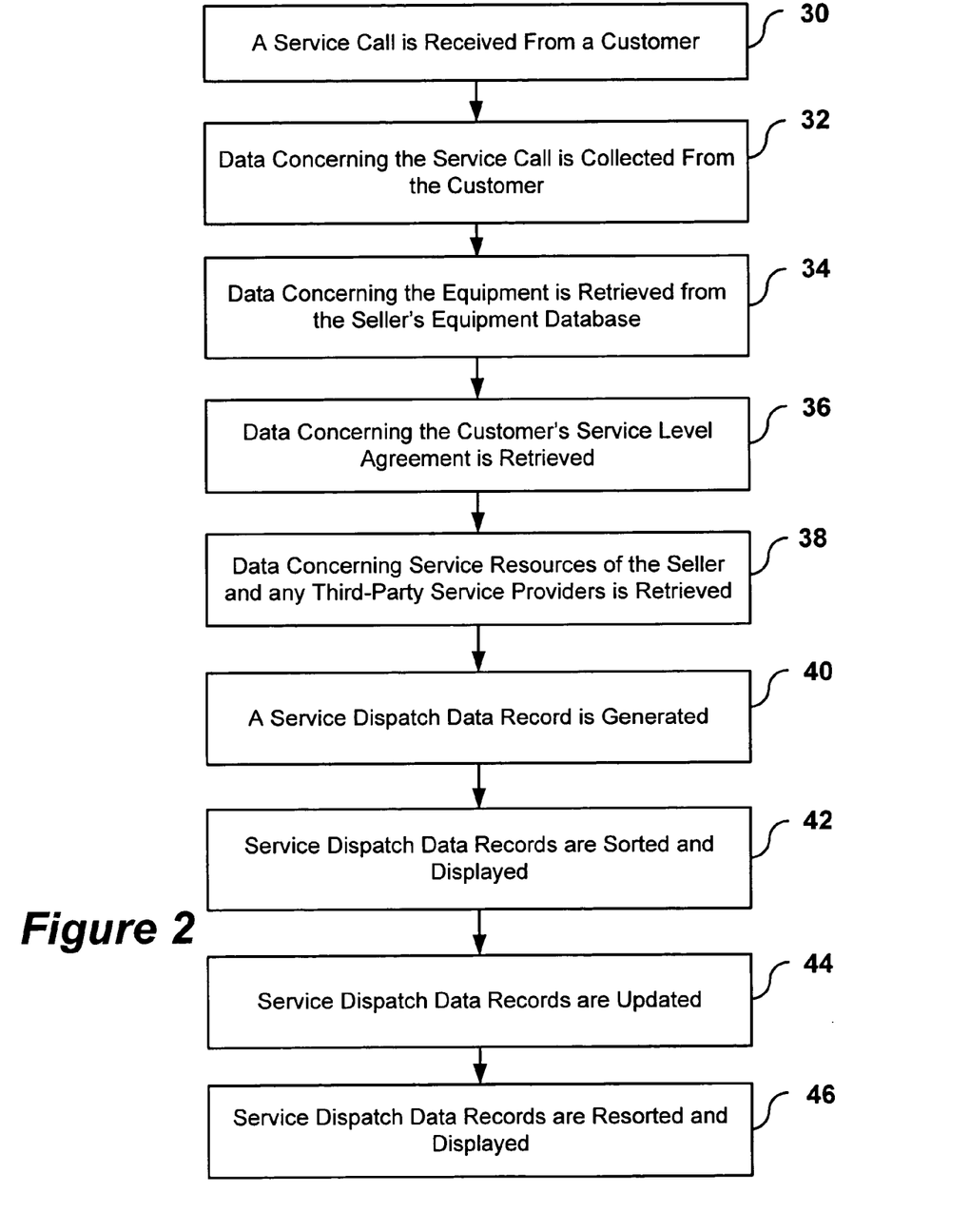
FIG. 2 is a flow diagram of a method for the receipt of a service call and the transmission of data concerning the service call to a service dispatch management process.

Data from the dispatch generation process 18 is sorted for display by the service dispatch management process 20. Shown in FIG. 2 is a flow diagram of the method steps associated with the receipt of a service call and the transmission of data to service dispatch management process 20. At step 30, a service call is received by a customer. Although the term service call suggests that the service call is made by telephone, a service call can be communicated from the customer to the seller by electronic mail, web-based submission, or any other suitable means of communication. A service call can also be reported to the customer on an automated basis as a result of the automated notification issued by the customer's equipment or on the basis of the remote, periodic monitoring of the customer's equipment by a diagnostic tool of the seller. At step 32, data concerning the service call, including data related to the customer and the equipment that is the subject of the service call, is received by the seller. At step 34, data concerning the equipment is retrieved from the seller's equipment database. At step 36, data concerning the service obligation of the seller is retrieved, and, at step 38, data concerning the service resources of the seller or any other engaged third-party service providers is retrieved. At step 40, a data record is generated for the service dispatch. At step 42, the service dispatch data records are sorted and displayed.

As indicated at step 44, the data of each service dispatch record is continually updated to reflect changes to the data of customer database 14 and service provider database 16. Following the generation of a service dispatch record, the data of the service dispatch record can be updated at regular intervals by repopulating each service dispatch record with the data from each of the customer database 14 and service provider database 16. In this manner, as data is changed in either the customer database 14 or service provider database 16, the updated data will be reflected in each affected service dispatch record. As an alternative to a periodic refreshing of each service dispatch record, individual service dispatch records could be updated following an indication from either of the customer database 14 of the service provider database 16 that updated data concerning the service dispatch record is present in the database. At step 46, updated data records are resorted and displayed.

The service dispatch records are sorted for display by the data management module in a manner that assists the seller in the handling and resolution of service dispatches. In one embodiment of the present disclosure, each service dispatch must be associated with or claimed by a customer service representative of the seller. The association of each service dispatch with a customer service representative insures that each service dispatch is assigned to a human representative who can troubleshoot any difficulties in the resolution of the dispatch. The association of a customer service representative with each service dispatch also insures that a customer service representative is in place and responsible for the involvement of any third-party service providers in the completion of the service dispatch. When a service dispatch is initially generated by dispatch generation module 18, the service dispatch will not be associated with a customer service representative. An initiated service dispatch is not associated with a customer service representative until a customer service representative claims the service dispatch. Requiring that a customer service representative take an affirmative action to claim a service dispatch forces the customer service representative to confirm the existence of the service dispatch and take a personal interest or investment in the completion of the service dispatch.

The dispatches are sorted for display in a table format in which selected data for a single service dispatch occupies a row of the table. The table is itself organized so that that the data records are arranged in the table such that those service dispatches that have not yet been claimed by a service representative and that include an unacknowledged missed gate are displayed most prominently in the table. A service dispatch includes an unacknowledged missed gate when the missed gate of the service call, even if unresolved, has not yet been affirmatively recognized by any customer service representative as being in existence. A customer service representative may acknowledge a missed gate by in some manner confirming through the dispatch management process the existence of the missed gate. The first priority for sorting and display are those services dispatches that are both unclaimed by a customer service representative and that include an unacknowledged gate failure. Within the sorting criteria disclosed herein, unclaimed service dispatch records generally have a higher display priority than claimed service dispatch records. Within the group of unclaimed service dispatches that have unacknowledged missed gates, service dispatches are sorted by the cumulative age of the service dispatch. As such, if a group of service dispatches are unclaimed and each includes at least one unacknowledged missed gate, the oldest of the service dispatches will be displayed most prominently in the table.

Following the display of unclaimed service dispatches that include at least one unacknowledged missed gates, claimed service dispatches that include at least one unacknowledged missed gate are sorted for display. As such, the next set of service dispatch records that are displayed most prominently are those that have been claimed by a customer service representative, but nonetheless include a missed gate that has not been acknowledged by the customer service representative. Within this set of service dispatches, the service dispatch with the oldest cumulative age is displayed the most prominently. Displaying service dispatches in table form according to this format results in the prominent display of those service dispatches that are the most likely to not be completed within the time window specified in the applicable service level agreement between the seller and the customer. Because the failure to comply with the contractual service level agreement may result in the loss of customer satisfaction, it is important that the most problematic service dispatches be displayed so that the seller's team of customer service representatives may direct their individual or collective attention to the completion of these service dispatches.

Figure 3:
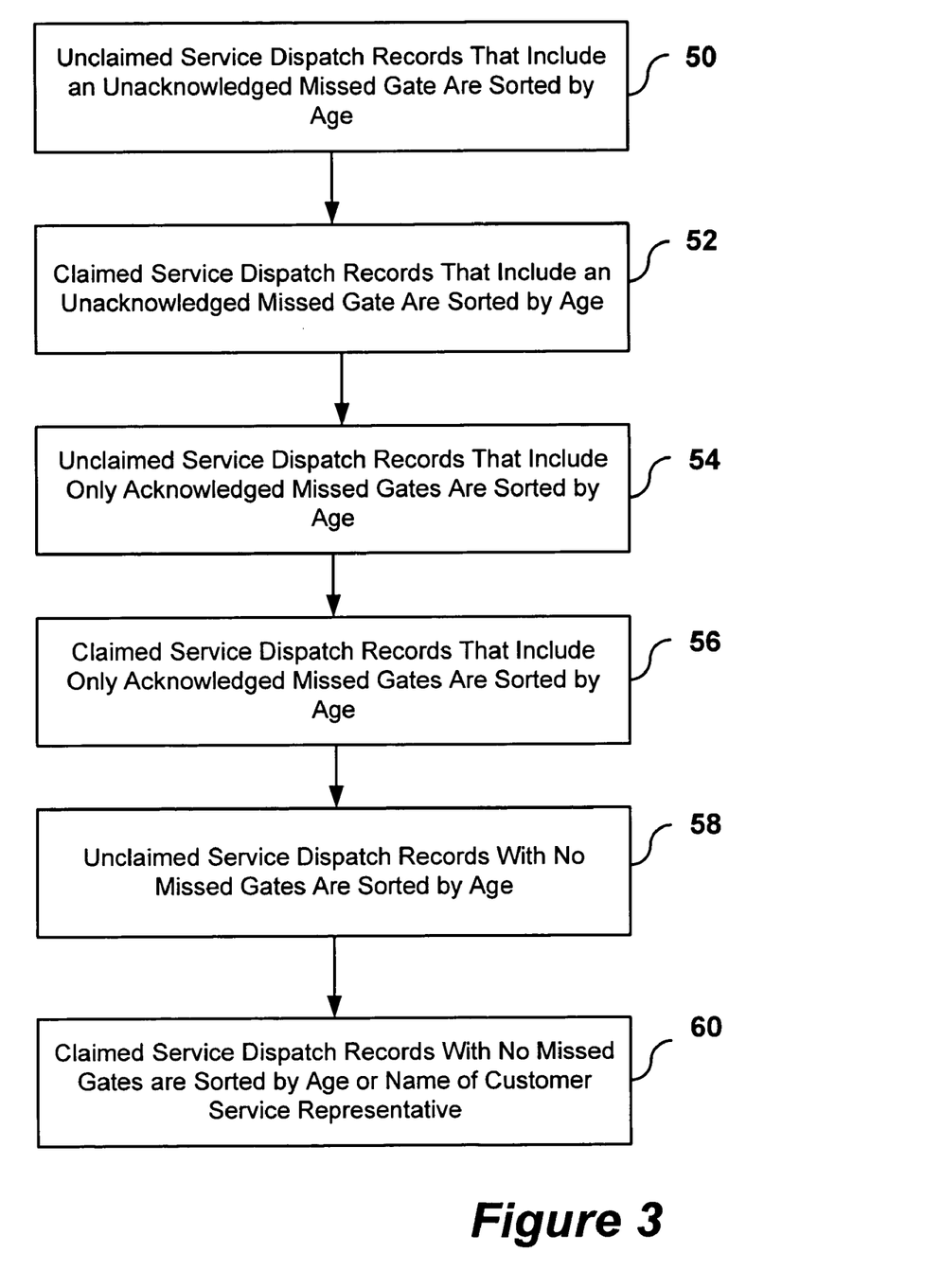
FIG. 3 is a flow diagram of a method for sorting service dispatch records for display.

Shown in FIG. 3 is a flow diagram of a method for sorting service dispatch records for display. At step 50, unclaimed service dispatches that include an unacknowledged missed gate are sorted for display according to the age of the service dispatch, with older service dispatches having a higher display priority than more recent service dispatches. At step 52, claimed service dispatches that include an unacknowledged missed gate are sorted for display, with older service dispatches having a higher display priority than more recent service dispatches. Considering steps 50 and 52, the high display priority of those service dispatches having an unacknowledged missed gate demonstrates the importance within the present disclosure of displaying those service dispatches that have a failed, predetermined milestone that has not yet been recognized by the seller or the service provider.

At step 54, unclaimed service dispatches that include only missed gates that have been previously acknowledged are sorted for display by the age of the service, with the oldest service call being displayed most prominently. At step 56, claimed service dispatches that include only missed gates that have been previously acknowledged are sorted by age. Thus, once all service dispatches having an unacknowledged missed gate are sorted at steps 50 and 52, the remaining service dispatches that have a history of missed gates are sorted at steps 54 and 54. At step 58, unclaimed service dispatches with no history of missed gates are sorted by age, and, at step 60, claimed service dispatches with no history of missed gates are sorted by age. For those claimed service dispatches with no history of missed gates, the service dispatches could also be sorted alphabetically by the name of the customer service representative.

Figure 4:
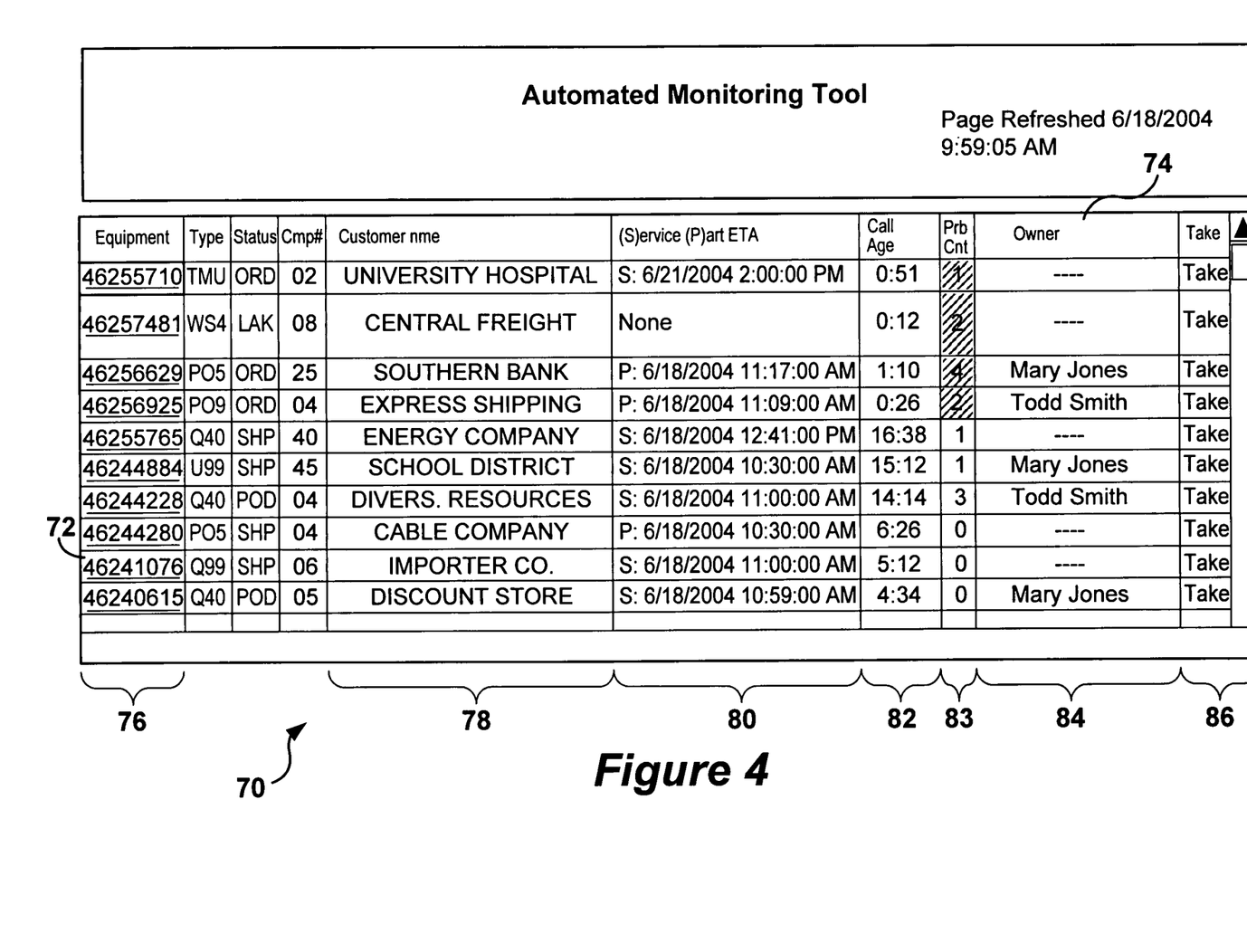
FIG. 4 is a display of sorted service dispatch records.

Shown in FIG. 4 is an example of a table 70 of service dispatch records that have been sorted for display according to the methodology set out in this disclosure. Table 70 includes a number of rows 72 and a number of columns 74. Each row is associated with a single service dispatch record and each column represents a data element, such as the equipment number or customer name, from each service dispatch record. Each displayed data record includes a display in column 76 of the equipment number, which is an identifier for the model of equipment that is the subject of the service dispatch. Included in column 78 of the table is the customer name associated with each service dispatch record. Column 80 includes the estimated time of arrival of the replacement component or technician at the location of the equipment. Shown in column 82 is the cumulative age of each service dispatch. The cumulative age of each service dispatch is a measure of the time elapsed since the initiation of the service dispatch.

The problem count column 83 is a count of the number of missed gates in the service dispatch, and column 84 is the owner or service representative of the seller who is responsible for the service dispatch. In one example, the problem count, which represents the number of failed gates associated with the service call, is never decremented to reflect that the task associated with an overdue milestone has been satisfied. Rather, the problem count reflects the number of problems associated with the service dispatch and serves a proxy for customer satisfaction with respect to the timely completion of the service dispatch. For those service dispatches that included an unacknowledged missed gate, the number in the problem count is shaded for a better visual identification of those service dispatches that include a missed milestone that has not yet been addressed by a customer service representative. Column 86 is a Take column that allows a customer service representative to confirm that he or she will be responsible for an unclaimed service dispatch or to request responsibility for a service dispatch that has been claimed by another service representative.

Following the sorting priority set out in the flow diagram of FIG. 3, the service dispatch record for customers University Hospital and Central Freight are displayed most prominently (at the top) of the table in FIG. 4 because each has not yet been claimed by a customer service representative and each includes an unacknowledged missed gate. As between the record for University Hospital and the record for Central Freight, the record for University Hospital is displayed more prominently because it has an older cumulative age of fifty-one minutes, as compared to an age of twelve minutes for the Central Freight record. Following the service dispatch record for Central Freight, the next most prominently displayed service dispatch in FIG. 4 is the record for Southern Bank. The service dispatch record for Southern Bank is a claimed service dispatch that has a count of four missed gates or milestones, including at least one currently unacknowledged missed gate. Following the service dispatch record for Southern Bank is the service dispatch record for Express Shipping, which has a count of two missed gates, including at least one currently unacknowledged missed gate. The service dispatch record for Southern Bank is displayed more prominently than the service dispatch record for Express Shipping because of the older cumulative age of the service dispatch record for Express Shipping.

The service dispatch record having the next highest display priority is for Energy Company. The service dispatch record for Energy Company is not claimed and has a history of one missed gate, which has been acknowledged. It is possible for a service dispatch to have an acknowledged missed gate and still be unclaimed by a service provider. This may occur if a customer service representative has relinquished control of a service dispatch or if a missed gate has been acknowledged by the monitoring tool itself or a supervisor. The service dispatches for School District and Diversified Resources are displayed next. Each includes a history of acknowledged missed gates and each is claimed. The service dispatch for School District is displayed more prominently because of its older cumulative order age. The next two service dispatch records, for Cable Company and Importer Company, are each unclaimed and do not have a history of missed gates. Finally, the service dispatch record for Discount Store is claimed and does not have a history of missed gates.

Although the sorting priority described above may be used as a default sorting priority, it should be recognized that other sorting schemes may be employed by customer service representatives or other users of the computer system. As an example, if a user were to select or click on a column 74, the data records would sort themselves according to the criteria set out in the column. As an example, clicking on the owner or service representative column 84 will cause the data records to sort alphabetically by the name of the owner or service representative. Similarly, selecting the call age column 82 will cause the service dispatch records to be sorted in ascending order by cumulative age. Selecting the all age column 82 a second time will cause the service dispatch records to be sorted in descending order by cumulative age. As another example, selecting the problem count column 83 will cause the service dispatch records to be sorted in ascending or descending order by problem count. In addition, service dispatch records could be sorted such that first priority is assigned to unclaimed service dispatch records by the problem count of each service dispatch record, followed by, as a second priority, claimed service dispatch records by the problem count of each service dispatch record.

Figure 5:
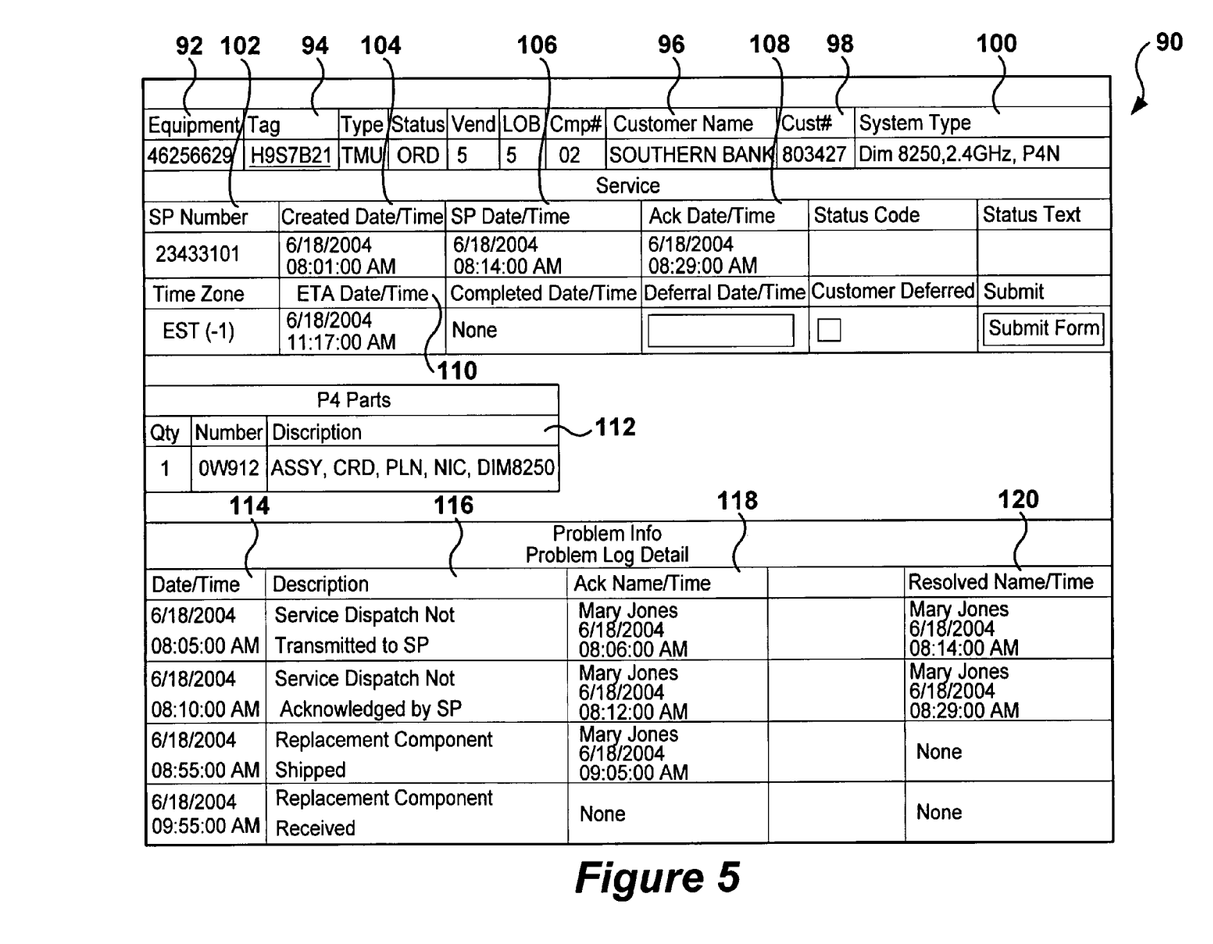
FIG. 5 is a display of a detail page concerning a service dispatch record.

A service representative or other user of the sorting and display tool of the service dispatch management process may select any service dispatch to be linked to a page that shows more detail concerning the service dispatch. Shown in FIG. 5 is the detail page 90 for the service dispatch record of FIG. 4 associated with customer Southern Bank. The upper half of detail page 90 includes for each record an identification of the equipment number at 92, the service tag or indicator for the service dispatch at 94, the name of the customer at 96, and the customer's unique customer number at 98. Also included for each service dispatch at 100 is a description of the equipment that is the subject of the service call. In the example of FIG. 5, a third-party service provider is engaged to complete the service required by the service call. The third-party service provider's service dispatch number for this service dispatch is shown at 102.

Shown at entries 104-110 are a series of timing entries concerning the service dispatch. The time of the establishment of the service call is shown at 104. The time of the transmission of the data concerning the service call to the third-party service call is shown at 106, and the time of the third-party service provider's acknowledgement of the service call is shown at 108. An estimate of the time for the completion of the service required by the service dispatch is shown at 110. In this example, the service dispatch detailed in FIG. 5 is scheduled to be completed within the four-hour window specified in the service agreement between the seller and the customer. Block 112 includes a description of the service to be performed on the product. In this example, the service to be performed concerns the installation of replacement components.

The lower half of detail page 90 includes data concerning the milestones for the service dispatch. Each row of the table in the lower half of detail page 90 is a milestone. From left to right, the columns in the table represent the completion time for the milestone at column 114, the description of the milestone at column 116, the name of the responding service representative and time for response at column 118, and the name of the resolving service representative and the time of resolution at column 120. The four missed milestones of the table correspond to the missed milestone count of four in column 83 in FIG. 4. The first row of the table concerns the first missed milestone, which was the failure to transmit the service dispatch to the engaged service provider within five minutes of the initiation of the service dispatch. The missed milestone of the second row concerns the failure of the service provider to acknowledge its receipt of the service dispatch within ten minutes of the initiation of the service dispatch. The missed milestone of the third row relates to the failure to ship the replacement component within one hour and fifty-five minutes of the initiation of the service dispatch, and the missed milestone of the fourth row as triggered because the replacement component was not received by the customer within two hours and fifty-five minutes of the initiation of the service dispatch. The first two missed milestones have been acknowledge and resolved by service representative Mary Jones. The third missed milestone, which concerns the shipment of the replacement component, has been acknowledged but not resolved by the service representative. The fourth missed milestone, which concerns the receipt of the replacement component at the customer's site, has not yet been acknowledged by the customer representative. Thus, by selecting a service dispatch, a service representative or a service supervisor can monitor the details of a service dispatch, including the listing of missed milestones.

The dispatch scenario, such as the one described above, can be complicated by external factors at or near the customer's location that is the focus of the service event. External factors, such as weather, unplanned events and/or planned events can affect how long it takes to service the dispatch. Specifically, planned or unplanned events may include road closures that preclude or delay the delivery of parts or the arrival of a technician needed to service the call. Access to the customer facility, or alternate routes, is important and perhaps crucial if there service call is to be satisfied within the contractual time limits. For example, the advent of a hurricane at the customer's location that is the focus of the service call can affect the ability of third party service providers to reach the location. Similarly, inclement weather may affect the ability of parts suppliers to ship the needed parts to the customer's location within the given time period. In those circumstances, access routes may be blocked and alternate routes to the customer's location may be needed. Similarly, fetching parts from an alternate storage facility may be worthwhile, even if that facility is farther from the customer's location, because the routes to the alternate storage facility may not as obstructed and thus may enable the third party vendor to ship the needed part to the customer's location within the requisite time period.

Figure 6:
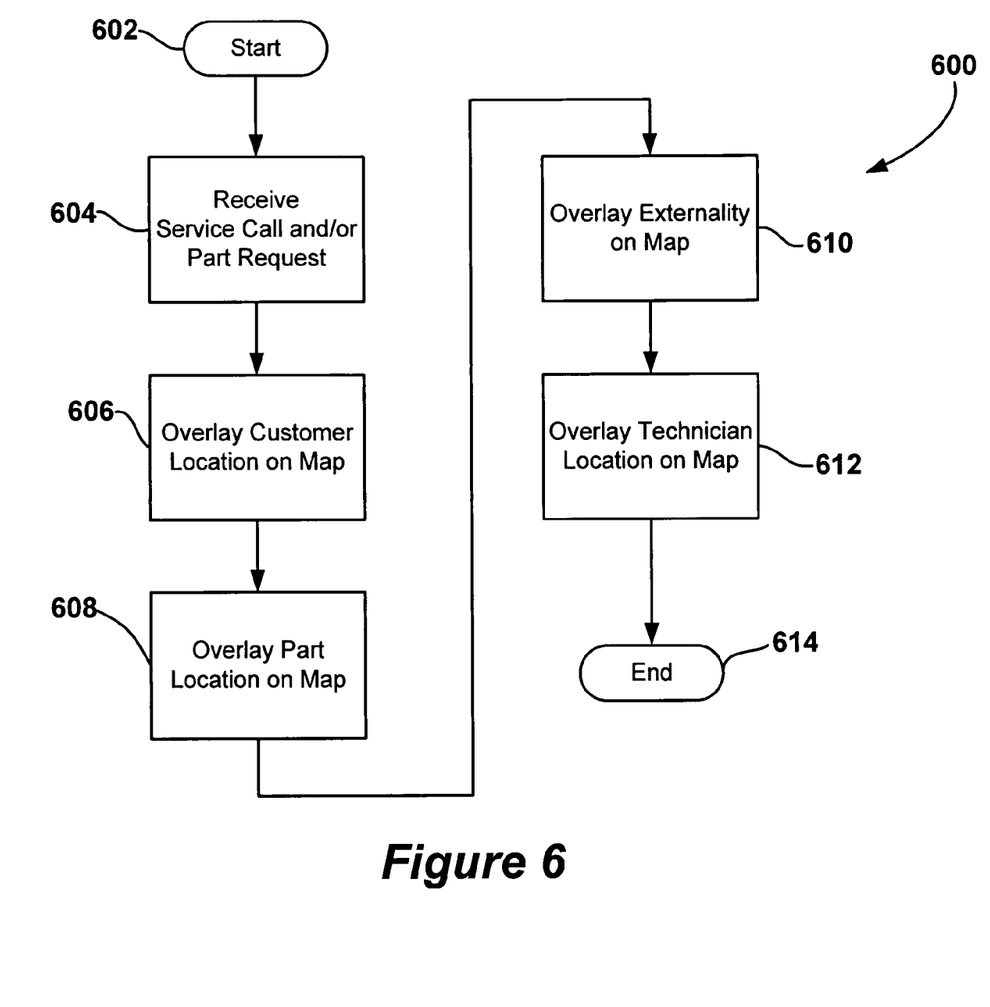
FIG. 6 is a flowchart illustrating the method of overlaying information on a map.

In general, the method of applying geographic information is illustrated in FIG. 6. Specifically, the method 600 begins generally at step 602. The service call and/or part request are made by the customer in step 604. The system disclosed herein, with or without intervention by the seller's representative, the customer's location (where the part is requested or where the customer's representative requests service) is overlaid onto the map in step 606. The location of the needed parts, if any, are overlaid on the map in step 608. Any externalities, such as weather, or planned/unplanned events, are overlaid instep 610. In step 612, the location of a technician (if needed) is overlaid onto the map as well and the method ends generally at step 614. It should be noted that the order of the overlays is not important, and the steps of the method 600 can be interchanged without detriment.

The geographic-related information may be stored in a geographic information database. The geographic information database may contain, for example, street maps, weather patterns, calendar data (as they related to events at given locations) and the like. The geographic information database may be linked to one or more displays, such as monitors, web pages and the like. Data from the other databases disclosed herein may include location information, and may be correlated (from a geographic standpoint) with the data in the geographic information database. For example, the location of the equipment that is the subject of a service call (i.e., the customer location) can be displayed on a map along with the street information (orientation, capacity, name, etc.). This combination of geographic information can be used by dispatchers, technicians, shippers, and others to help find the fastest, or the clearest route to the customer location.

Figure 7:
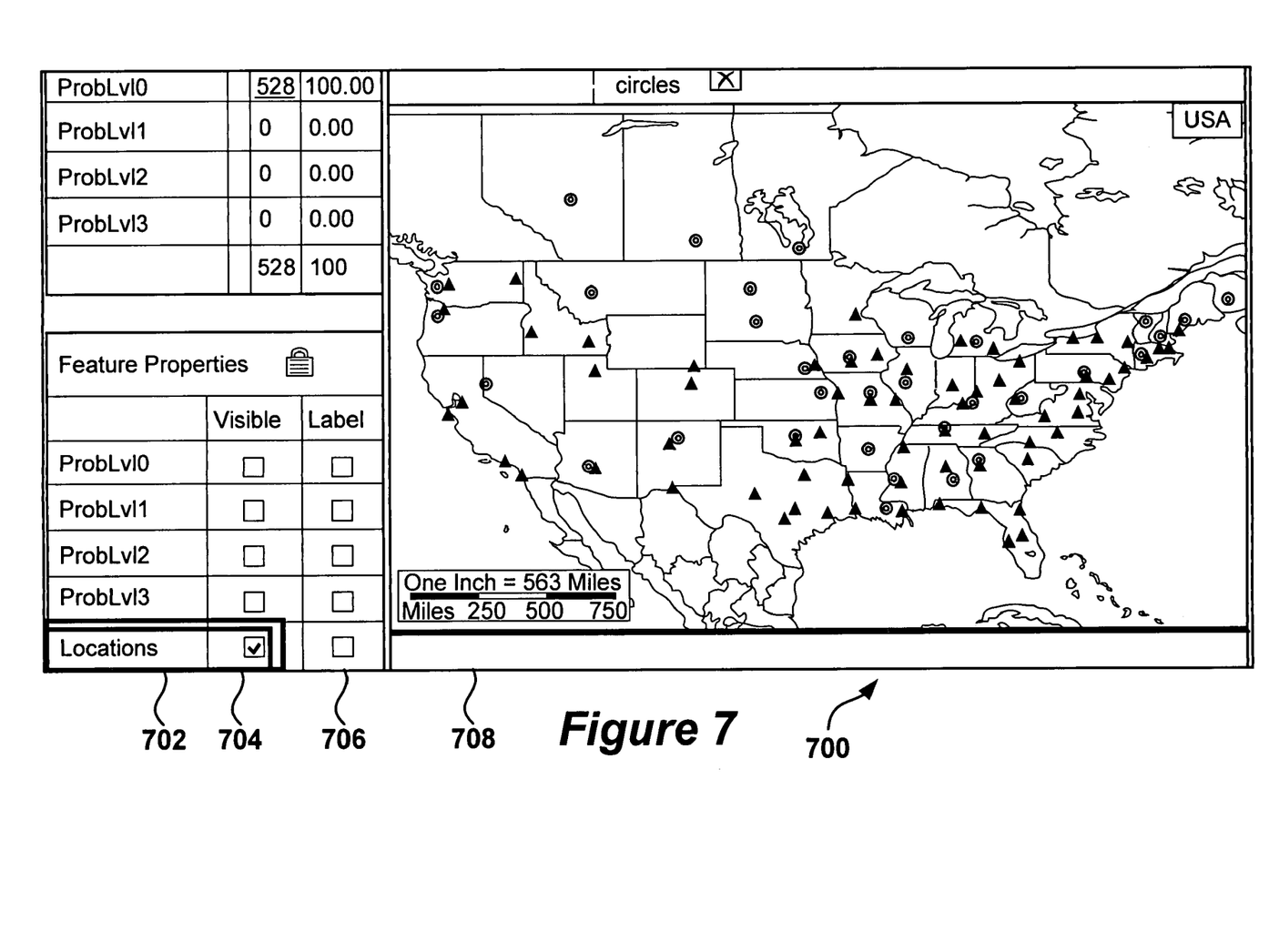
FIG. 7 is a block diagram illustrating a set of geographic-related information.
Figure 8:
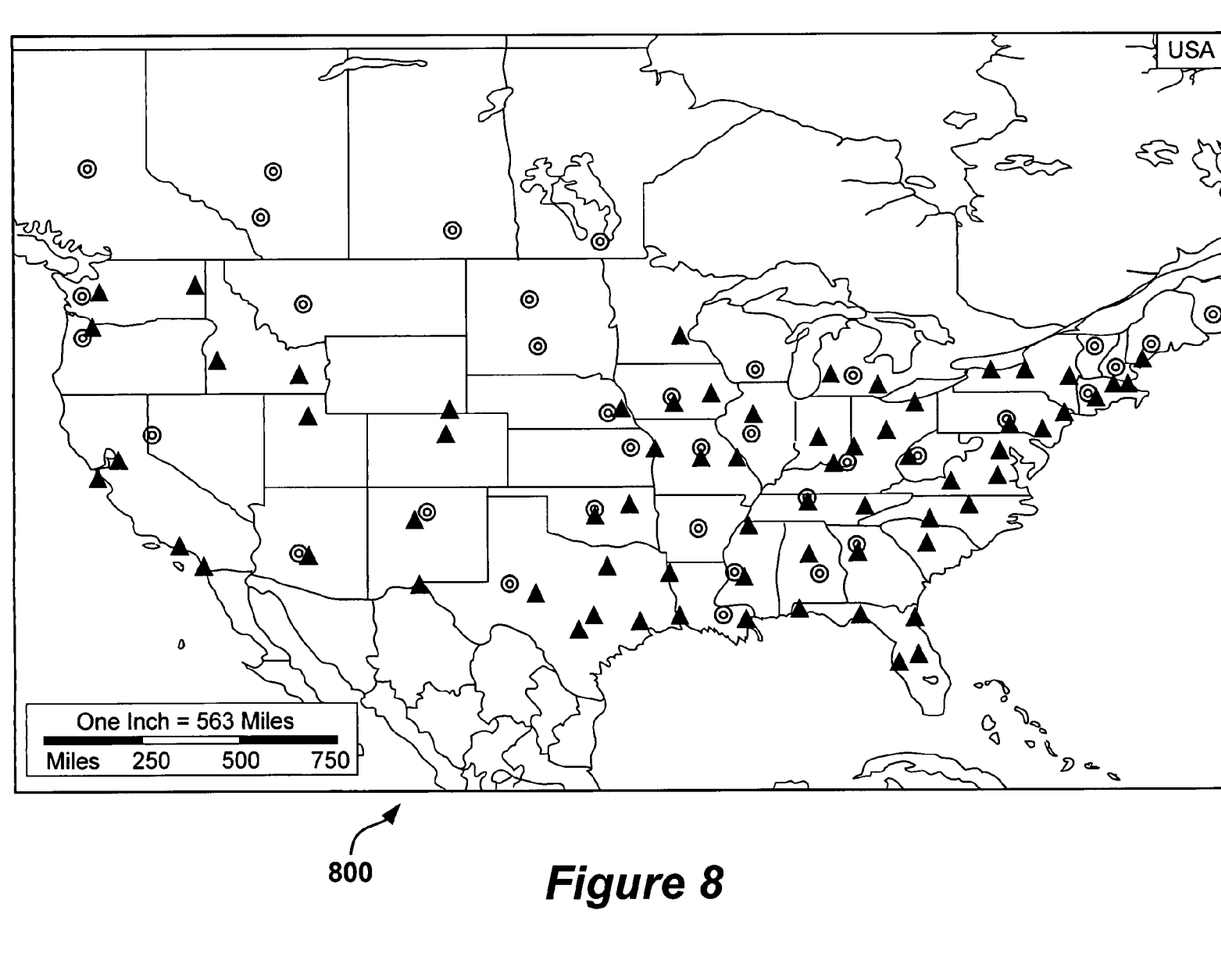
FIG. 8 is a block diagram illustrating a set of geographic-related information.

The overlay of information using maps is best illustrated in FIGS. 7 through 11. It should be noted that the maps disclosed herein may be displayed in a variety of manners, such as via a web page, client software application, or similar mechanisms. It is useful to provide the user with some means for manipulating the information that is displayed. Specifically, buttons, knobs, sliders, or the like so that the user may manipulate the amount of information on the map, the orientation of the map, the scale of the map, etc. For example, the map 700 of FIG. 7 contains a set features 702 (ProbLv10, ProbLv11, etc.) with buttons 704 and 706 for making the information visible and labeled, respectively onto the map 708. The example of FIG. 7 shows the locations of parts warehouses overlaid onto a map of the United States with only the names and locations of states and their respective capitals. Similarly, FIG. 8 shows a zoomed in map 800 of the United States with the locations of vendor facilities in addition to the locations of the warehouses (illustrated in FIG. 7).

Figure 9:
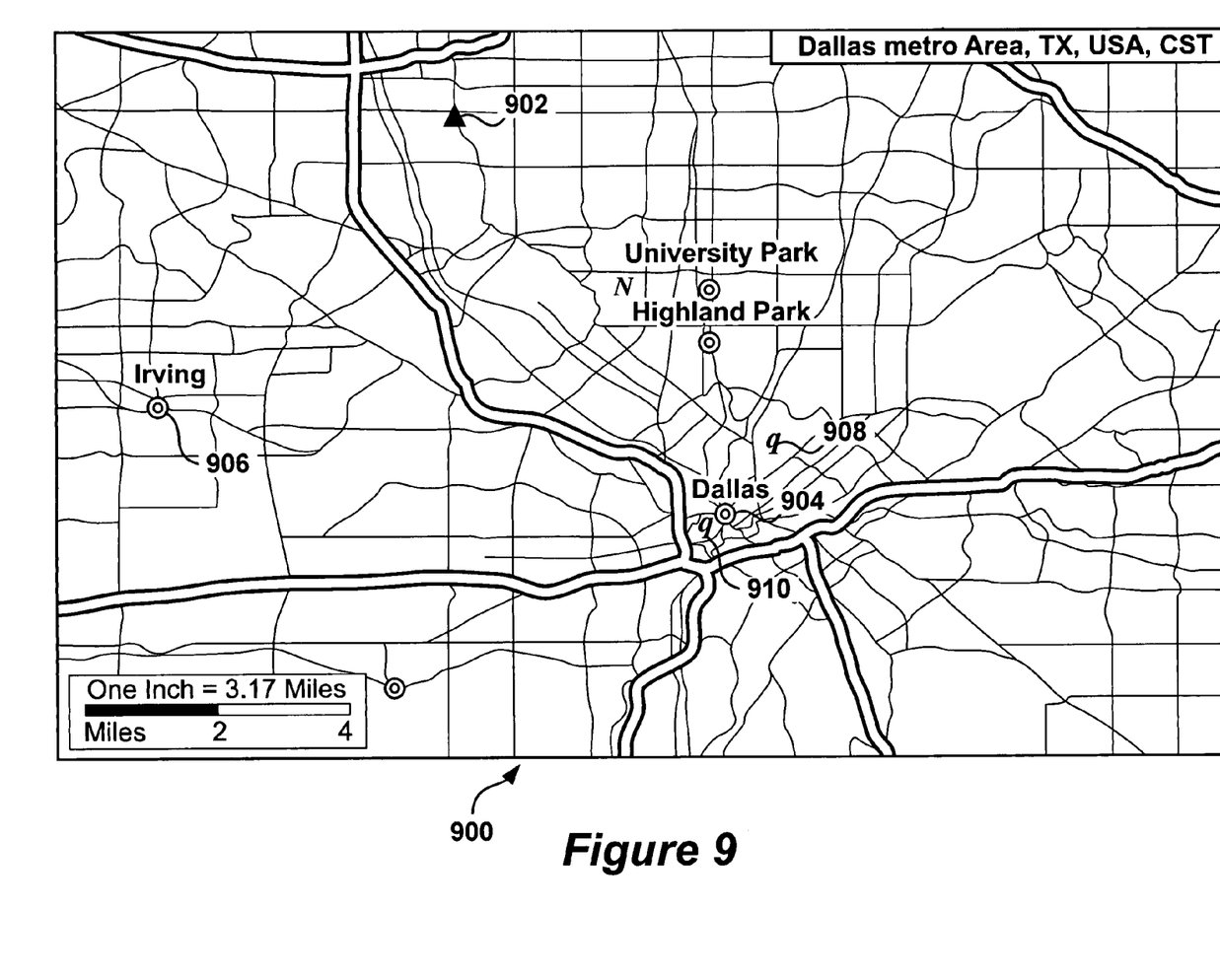
FIG. 9 is a block diagram illustrating a set of geographic-related information.

The methods and apparatus disclosed herein enable a user, such as a seller's dispatcher, to zoom in on locations related to the service call in question. For example, FIG. 9 illustrates a map 900 that shows the warehouse location 902 with respect to Dallas, Tex. 904 and Irving, Tex. 906. Also shown are the locations 908 and 910 that indicate the position of third party technicians (designated by the letter "q"). The system disclosed herein can use letters, symbols, icons, fonts, etc. to distinguish various elements and their characteristics as they relate to the service call or parts request. For example, higher priority calls can be colored in red, while completed tasks can be colored in green. Similarly, vendors from one organization can be designated as "q" while vendors of another organization (who perform the same or other service) can be designated with "t".

Figure 10:
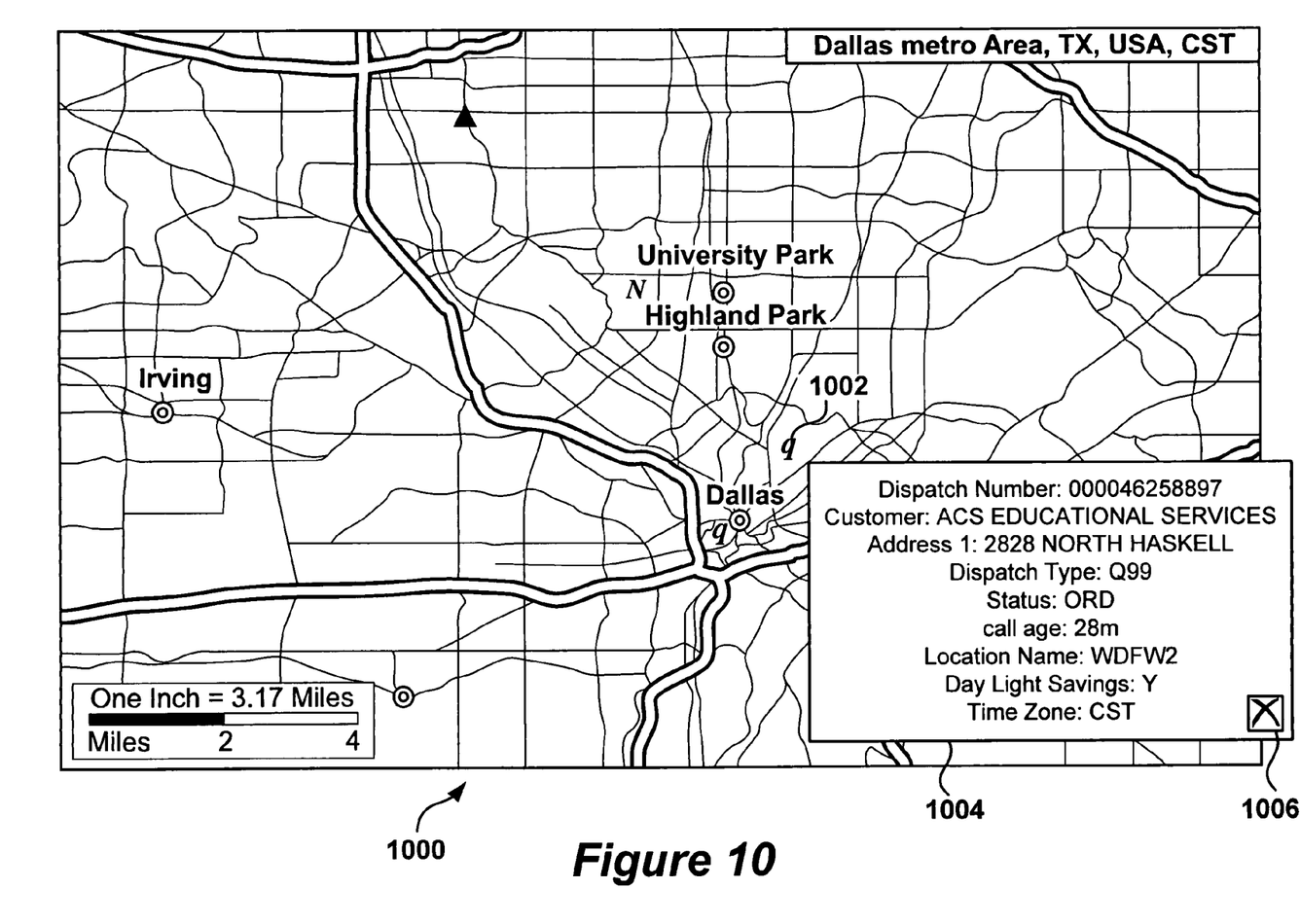
FIG. 10 is a block diagram illustrating a set of geographic-related information.

FIG. 10 illustrates a feature of the present invention, wherein one of the "q" designations has been selected by the user by, for example, clicking on the letter or icon 1002 at the desired location on the map 1000. An informational box 1004 is displayed adjacent to the letter or icon that lists pertinent information regarding the service call such as, for example, the dispatch number, the name of the customer, the address where the problem was encountered, the dispatch type, the age of the service call, the name or designation of the location, and the time zone. More or less information may be displayed depending upon the type of problem encountered, and/or the specific preferences of the user. When the user if finished, the informational box 1004 may be closed, for example, by clicking the "X" button 1006.

Figure 11:
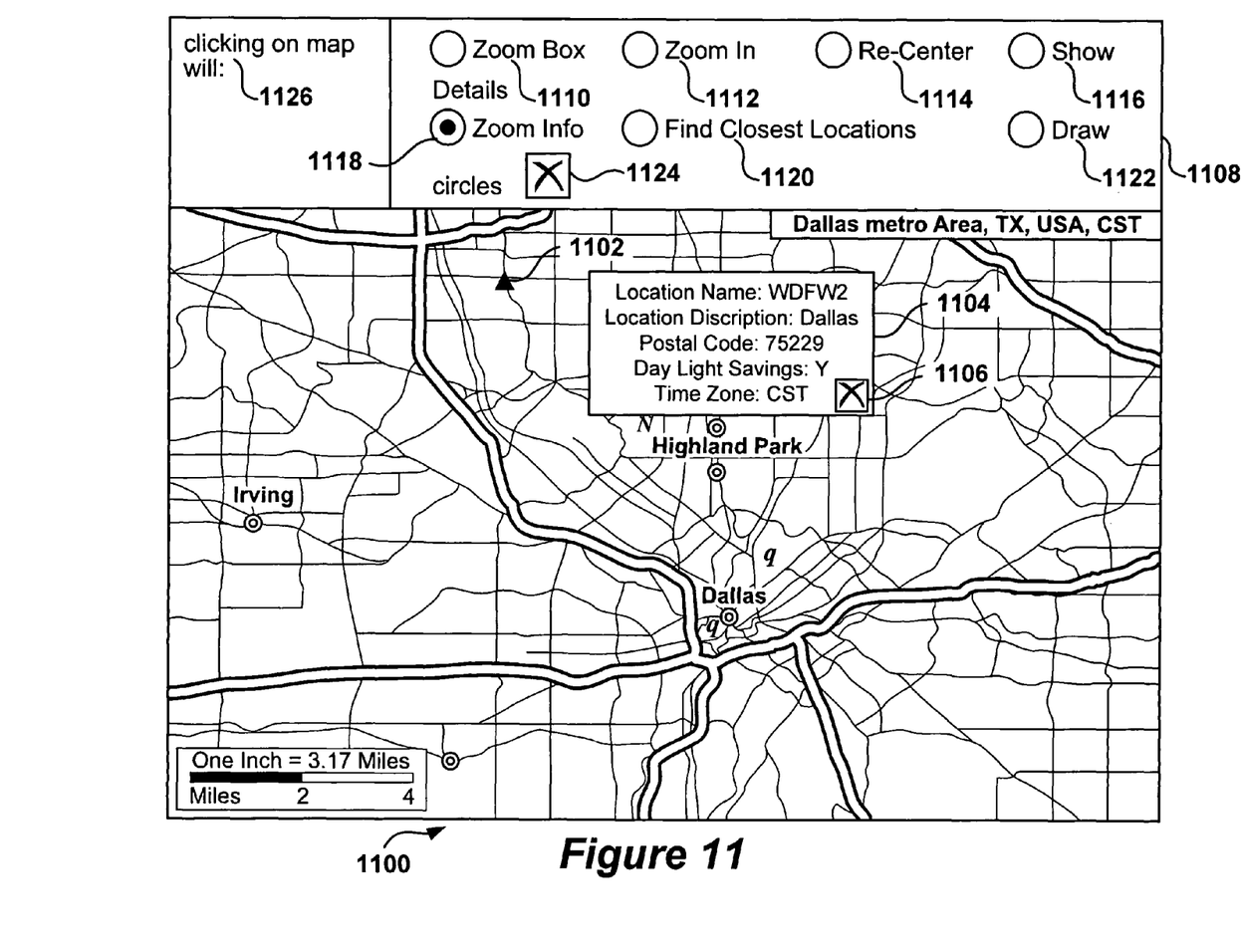
FIG. 11 is a block diagram illustrating a set of geographic-related information.

FIG. 11 illustrates the context-sensitive set of information that may be displayed on the map 1100. In this example, a warehouse 1102 has been selected by the user, whereupon the informational box 1104 is displayed that indicates, for example, the location name, the location description, the postal (zip) code, the time zone and daylight savings designation, etc. As with the previous example, the amount or type of information that is displayed in the informational box 1104 can be changed, depending upon the type or character of the item selected, and/or by the user's preferences. The map 1100 also has user selections in the form of radio buttons 1110 through 1122. For instance, the selection section 1108 can have a zoom box designation 1110, a zoom in designation 1112, a re-center command 1114, a show command 1116, a show info command 1118, a find closest locations command 1120 and a draw command 1122. It should be noted that the selection box 1108 can be fitted with any variety of command buttons or other command indicia in any manner best suited to the particular situation. As an aid to the user, instructional information 1126 may also be provided with the selection box 1008. In this example, the selection box can be closed simply by clicking on the "X" button 1024.

The maps disclosed herein may be zoomed in to any level up to and including the maximum resolution of the underlying location data. In some instances, the map may be zoomed in to the street level, or out to the national level, or any level in between. The network and telecommunications capabilities described above may be used to convey external information taken from, for example, the National Weather Service, Traffic Services, etc. and overlaid upon the map in the same manner as the other information described herein. For example, if a traffic accident occurs near the customer's location, that information may be displayed on the map, and the seller's dispatcher may inform the third party technician of the problem so that the technician has a chance to take an alternate route and thus minimize the delay. In fact, the seller's dispatcher may be able to suggest an alternate route and convey that information via, for example a cellular telephone. The third party technician and/or parts deliverer may be equipped with, for example, global positioning system ("GPS") equipment that enables the tracking of their locations continuously or periodically. The location information can be updated continuously/periodically throughout the service call, or on an as-needed basis. Other means for determining the location are periodic reports from the shipper and/or technician, sightings from traffic or building cameras, etc.

As with the traffic example, the weather embodiment can overlay information directly from weather services, such as radar images from the National Weather Service or other sources. Severe weather, such as flooding, hurricanes, tornados, etc. may be tracked and that information overlaid onto the map so that corrective action (such as rerouting or customer notification) can be taken. While the overlay of the information is desirable, it is not completely necessary. For example, the seller's dispatcher view two maps, one with the weather and one with the service call data, and make the necessary correlation.

The sorting and retrieval capabilities described above afford the dispatcher (and potentially the customer, shipper and third party technician) the ability to retrieve large amounts of disparate information merely by clicking on a particular location or icon and selecting the desired information. The capabilities possible with the system disclosed herein provides the seller and related service providers with the ability to react quickly and accurately to unforeseen events.

While the system disclosed herein can be used reactively, it may also be used proactively. Proactive use of the system includes running "what-if" models to determine, for example, the best placement of technicians and parts would be during a future event, such as the advent of a hurricane or a planned man-made event with attendant traffic disruption, such as a political convention attended by high-level dignitaries. Each "what-if" model may include, for example, the expected street-closures, as well as a random sample of equipment failures that would be expected for the requisite time period. One of the seller's dispatchers, perhaps in conjunction with third party shippers and technicians, can review how to handle the simulated service calls in light of the known street closures. The results of the "what-if" models can be used to pre-position parts and technicians in different locations during the future event so that service to regular customers is not disrupted.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method comprising:
   receiving a request from a customer, wherein the request pertains, at least in part, to a customer location and an equipment failure of at least one component of equipment associated with the customer;
   determining a service level obligation associated with the at least one component of equipment associated with the customer;
   overlaying the customer location on a map, wherein the step of overlaying the customer location on a map is completed by an information handling system comprising a processor and a memory;
   overlaying the location of an object needed to service the request on the map, wherein the step of overlaying the location of an object is completed by the information handling system; and
   servicing the request using the map, wherein the map indicates a current priority level for the request, and wherein the step of servicing the request is based, at least in part, on the service level obligation.

2. The method of claim 1, wherein the object needed is a part.

3. The method of claim 1, wherein the object needed is a technician.

4. The method of claim 1, wherein the object needed is an externality.

5. The method of claim 4, wherein the externality is weather.

6. The method of claim 4, wherein the externality is a planned event.

7. The method of claim 4, wherein the externality is an unplanned event.

8. The method of claim 4, wherein the externality blocks access the object's access to the customer location.

9. The method of claim 8, wherein the map enables the rerouting of the object to the customer location.

10. The method of claim 1, wherein the customer location is stored in a persistent database.

11. A method for identifying one or more access routes concerning the service dispatches of a service provider, comprising:
    creating a data record for each service dispatch, wherein the service dispatch pertains, at least in part, to a customer location and an equipment failure of at least one component of equipment associated with the customer, and wherein the data record includes a service level obligation associated with the at least one component of equipment associated with the customer;

displaying an icon for the service dispatch on a map, wherein the step of displaying the icon is completed by an information handling system comprising a processor and a memory;

overlaying an externality on the map, wherein the step of overlaying an externality of the map is completed by the information handling system;

wherein the map indicates whether one of the one or more access routes is open; and wherein the map indicates a current priority level for the service dispatch.

12. The method of claim 11, wherein the externality is weather.

13. The method of claim 11, wherein the externality is an unplanned event.

14. The method of claim 11, wherein the externality is a planned event.

15. A method for servicing dispatches in response to a series of service calls, comprising:

identifying the location of equipment that is the subject of each service call;

identifying a service level obligation associated with each piece of equipment;

identifying service resources necessary to service each piece of equipment;

generating a service dispatch that is associated with each service call, wherein each service dispatch is associated with a service dispatch record;

establishing a set of expected milestones associated with each service dispatch; p1 overlaying the location of equipment onto a map, wherein the map indicates a current priority level for the service dispatch, wherein the step of overlaying the location of equipment onto a map is completed by an information handling system comprising a processor and a memory;

overlaying an externality onto the map that may affect completion of one or more milestones, wherein the step of overlaying an externality onto the map is completed by the information handling system; and monitoring, with respect to each service dispatch, the completion of the milestones associated with the service dispatch.

16. The method of claim 15, wherein the externality is weather.

17. The method of claim 15, wherein the externality is an unplanned event.

18. The method of claim 15, wherein the externality is a planned event.

19. A system for managing service dispatch records associated with service calls to a service provider, comprising:

a customer database storing data concerning the service level obligation of the service provider for the customer of the products that are the subject of the service calls;

a service provider database storing data concerning service dispatch resources concerning the customer and product associated with the service call;

a geographic information database storing data concerning geographic locations, the geographic information database capable of generating a map;

a display that is operable with the customer database and the service provider database, the map constructed and arranged to display the data associated with the service call arranged by location on the map, wherein the map indicates a current priority level for the service call;

a service dispatch generation module operable to generate a service dispatch record on the basis of the data from the customer database, customer database, and service provider database, wherein a generated service dispatch record includes a set of service milestones to be met as part of the completion of the service dispatch associated with the service call.

20. The system of claim 19, wherein the geographic information is a street.

21. The system of claim 19, wherein the geographic information is weather.

22. The system of claim 19, wherein the geographic information is related to an unplanned event.

23. The system of claim 19, wherein the geographic information is related to a planned event.

* * * * *